US012561040B2

(12) United States Patent
　　Bae

(10) Patent No.: US 12,561,040 B2
(45) Date of Patent: Feb. 24, 2026

(54) DISPLAY DEVICE

(71) Applicant: LG ELECTRONICS INC., Seoul (KR)

(72) Inventor: Guen Sang Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/520,320

(22) Filed: Nov. 27, 2023

(65) Prior Publication Data

US 2024/0419293 A1     Dec. 19, 2024

(30) Foreign Application Priority Data

Jun. 13, 2023　(KR) ........................ 10-2023-0075257

(51) Int. Cl.
　　*G06F 3/0482*　　(2013.01)
　　*G06F 3/00*　　(2006.01)
　　　　　　(Continued)

(52) U.S. Cl.
　　CPC .......... *G06F 3/04812* (2013.01); *G06F 3/005* (2013.01); *G06F 3/0304* (2013.01); *G06F 3/0346* (2013.01); *G06F 3/0383* (2013.01); *G06F 3/0482* (2013.01); *G06F 3/0487* (2013.01); *G06F 3/14* (2013.01);
　　　　　　(Continued)

(58) Field of Classification Search
　　CPC .. G06F 3/04812; G06F 3/0487; G06F 3/0482; G06F 3/0304; G06F 3/005; G06F 3/0383;

G06F 3/0346; G09G 2354/00; H04N 5/45; H04N 21/431; H04N 21/41265; H04N 21/42204; H04N 21/42222
See application file for complete search history.

(56) References Cited

U.S. PATENT DOCUMENTS

2006/0250529 A1* 11/2006 Kondo ............. H04N 21/42204
　　　　　　　　　　　　　　348/739
2007/0168865 A1* 7/2007 Tsutsumi .............. G06F 3/0482
　　　　　　　　　　　　　　707/999.107
(Continued)

FOREIGN PATENT DOCUMENTS

CN　　　208875695　　　5/2019
EP　　　4086896　　　11/2022
(Continued)

OTHER PUBLICATIONS

Korean Intellectual Property Office Application No. 10-2023-0075257, Office Action dated Oct. 17, 2024, 7 pages.
(Continued)

*Primary Examiner* — Dismery Mercedes
(74) *Attorney, Agent, or Firm* — LEE, HONG, DEGERMAN, KANG & WAIMEY

(57) ABSTRACT

A display device according to an embodiment of the present disclosure may comprise a double-sided display including a transparent display panel, a user interface configured to receive a control signal from a remote control device and a controller configured to determine which direction the remote control device is located on a front side or a rear side of the double-sided display, and perform an operation according to the received control signal according to the direction in which the remote control device is located based on a determination result.

17 Claims, 18 Drawing Sheets

(51) Int. Cl.

| | |
|---|---|
| *G06F 3/03* | (2006.01) |
| *G06F 3/0346* | (2013.01) |
| *G06F 3/038* | (2013.01) |
| *G06F 3/04812* | (2022.01) |
| *G06F 3/0487* | (2013.01) |
| *G06F 3/14* | (2006.01) |
| *G09G 3/3208* | (2016.01) |
| *H04N 5/45* | (2011.01) |
| *H04N 21/41* | (2011.01) |
| *H04N 21/422* | (2011.01) |

(52) U.S. Cl.
CPC ............. *G09G 3/3208* (2013.01); *H04N 5/45* (2013.01); *H04N 21/41265* (2020.08); *H04N 21/42204* (2013.01); *H04N 21/42222* (2013.01); *G06F 2203/0384* (2013.01); *G09G 2340/0492* (2013.01); *G09G 2340/14* (2013.01); *G09G 2354/00* (2013.01); *H04N 21/422* (2013.01)

(56) References Cited

U.S. PATENT DOCUMENTS

| | | | |
|---|---|---|---|
| 2008/0031632 A1* | 2/2008 | Wu .................... | H04B 10/1141 398/140 |
| 2012/0256886 A1* | 10/2012 | Ryu ........................ | G06F 3/041 345/204 |
| 2014/0118227 A1* | 5/2014 | Lee ..................... | G09G 3/3208 345/76 |
| 2014/0267935 A1* | 9/2014 | Jung .................. | H04N 21/4223 348/734 |
| 2014/0359522 A1* | 12/2014 | Kim .................... | G06F 3/04812 715/835 |
| 2016/0239096 A1* | 8/2016 | Okuno ............. | H04N 21/42222 |
| 2017/0108718 A1* | 4/2017 | Park ...................... | G02F 1/1347 |
| 2017/0272681 A1* | 9/2017 | Oh .................... | H04N 21/42204 |
| 2018/0070122 A1* | 3/2018 | Baek .................. | H04N 21/4438 |
| 2018/0203660 A1* | 7/2018 | Hwang ................. | G06F 3/1423 |
| 2018/0236957 A1 | 8/2018 | Nam | |
| 2019/0035338 A1* | 1/2019 | Du ........................ | G09G 3/3406 |
| 2019/0102129 A1* | 4/2019 | Jo ......................... | G09G 3/2092 |
| 2019/0122018 A1* | 4/2019 | Kho .................. | G06V 40/1306 |
| 2024/0077996 A1* | 3/2024 | Kong .................... | G16H 40/63 |

FOREIGN PATENT DOCUMENTS

| | | |
|---|---|---|
| JP | S63-2476 | 1/1988 |
| JP | 2015194641 | 11/2015 |
| JP | 2019-087931 | 6/2019 |
| KR | 10-2012-0104467 | 9/2012 |
| KR | 10-2013-0036677 | 4/2013 |
| KR | 10-2015-0009204 | 1/2015 |
| KR | 10-2022-0027994 | 3/2022 |
| WO | 2011-118836 | 9/2011 |

OTHER PUBLICATIONS

European Patent Office Application Serial No. 24155181.1, Search Report dated Oct. 24, 2024, 17 pages.

European Patent Office Application Serial No. 24155181.1, Search Report dated Jul. 12, 2024, 14 pages.

Korean Intellectual Property Office Application No. 10-2023-0075257, Office Action dated Dec. 27, 2024, 7 pages.

* cited by examiner

Figure 2:
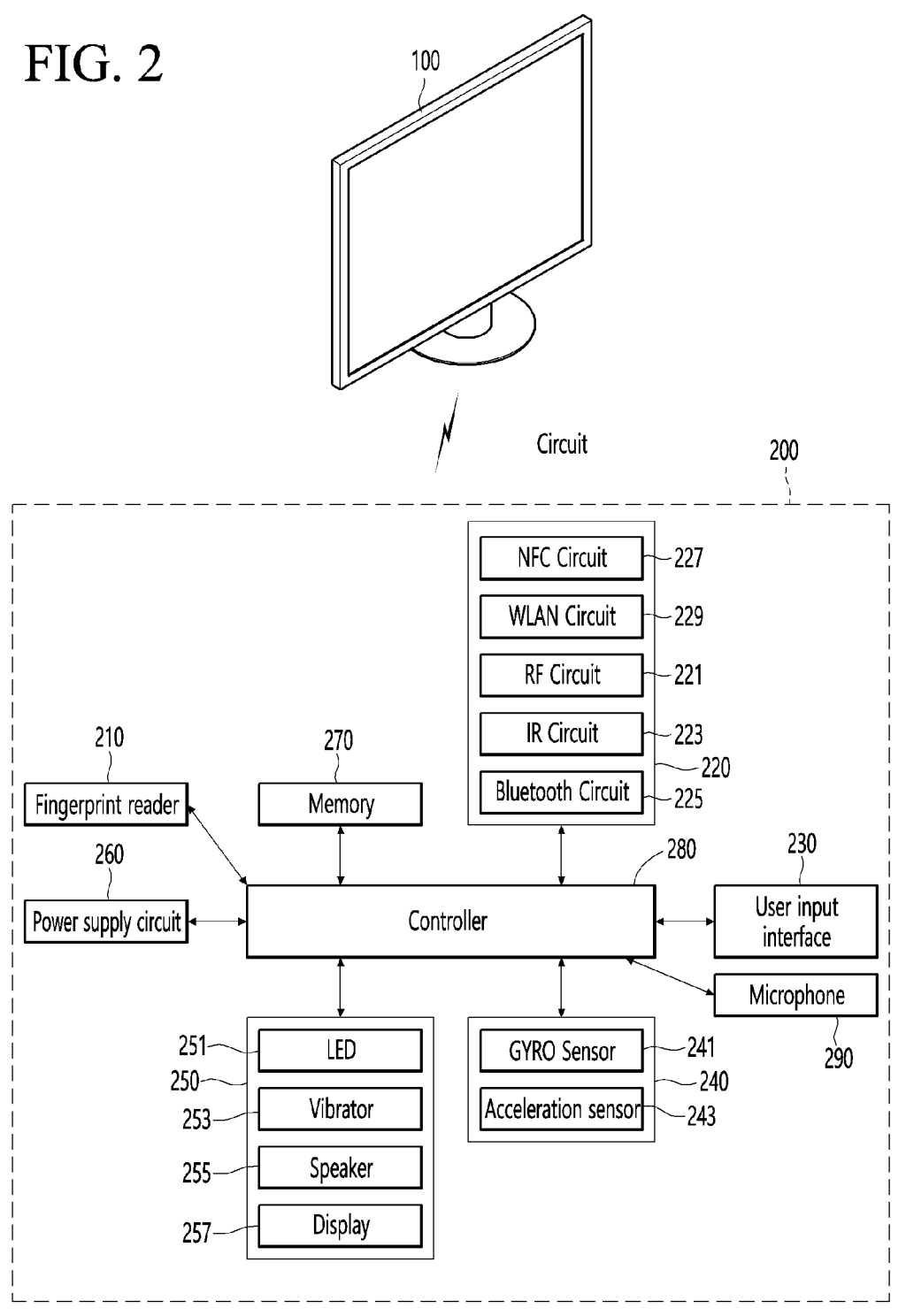

Circuit

200

| NFC Circuit | —227 |
| WLAN Circuit | —229 |
| RF Circuit | —221 |
| IR Circuit | —223 |
| | —220 |
| Bluetooth Circuit | —225 |

210

Fingerprint reader

270

Memory

260

Power supply circuit

280

Controller

230

User input interface

290

Microphone

251— LED
250—
253— Vibrator
255— Speaker
257— Display

GYRO Sensor —241
—240
Acceleration sensor —243

500 determine whether remote control device is located on the front or rear side of the double-sided display — S601 receive control signal from remote control device — S603 perform an operation according to the control signal according to the direction in which the remote control device is located — S605

FIG. 7

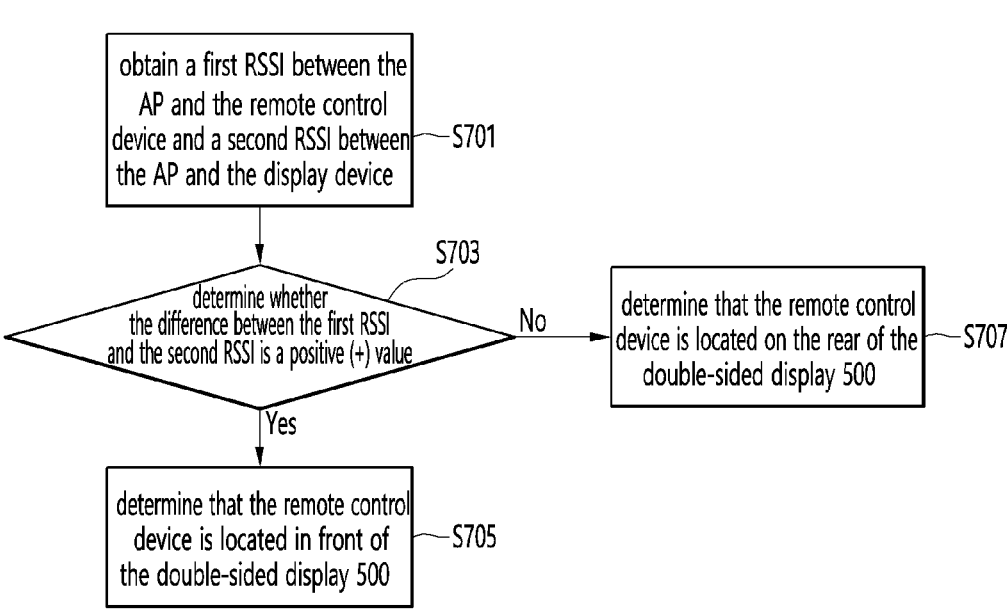

S601 obtain a first RSSI between the
AP and the remote control
device and a second RSSI between ──S701
the AP and the display device

S703 determine whether
the difference between the first RSSI
and the second RSSI is a positive (+) value No determine that the remote control
device is located on the rear of the ──S707
double-sided display 500

Yes determine that the remote control
device is located in front of ──S705
the double-sided display 500

DISPLAY DEVICE

CROSS-REFERENCE TO RELATED APPLICATION

Pursuant to 35 U.S.C. § 119(a), this application claims the benefit of earlier filing date and right of priority to Korean Patent Application No. 10-2023-0075257, filed on Jun. 13, 2023, the contents of which are hereby incorporated by reference herein in its entirety.

TECHNICAL FIELD

The present disclosure relates to a display device, and more particularly to a display device having a transparent display panel.

BACKGROUND ART

The information display is developing in a new aspect according to the development of technology. Among them, a transparent display device has a unique advantage of being able to show information with a background.

A transparent display device displays information on a screen through a transparent double-sided display using a property of transmitting light, and it is possible to view an image through both sides.

However, conventionally, when a user watches an image on the front side of a double-sided display and then moves to the rear side, the user sees the image reversely from the rear side.

In a situation in which the user moves to the rear, there is a problem in that the image is continuously viewed in reverse in a situation in which the user is only in the rear direction.

In addition, when the user is at the rear and manipulates the double-sided display through a remote control device such as a remote control, the movement direction of the cursor and the display direction of content images and graphic elements such as the cursor also become unnatural.

DISCLOSURE

Technical Problem

An object of the present disclosure is to provide a display device capable of different manipulations depending on the location of a remote control device when a double-sided display is controlled by a remote control device.

An object of the present disclosure is to provide a display device capable of naturally outputting an image and controlling graphic elements even if a remote control device is located on a rear side of a double-sided display.

Technical Solution

A display device according to an embodiment of the present disclosure may comprise a double-sided display including a transparent display panel, a user interface configured to receive a control signal from a remote control device and a controller configured to determine which direction the remote control device is located on a front side or a rear side of the double-sided display, and perform an operation according to the received control signal according to the direction in which the remote control device is located based on a determination result.

A method of operating a display device including a double-sided display including a transparent display panel according to an embodiment of the present disclosure may comprise determining which direction a remote control device is located on a front side or a rear side of the double-sided display, receiving a control signal from the remote control device and Based on a determination result, performing an operation according to the received control signal according to the direction in which the remote control device is located.

Advantageous Effects

According to an embodiment of the present disclosure, when the dual-sided display is controlled by a remote control device, the control may be varied depending on the location of the remote control device, resulting in an improved user experience.

In addition, even when the remote control device is located on the back of the double-sided display, image is naturally output and the user can easily control graphic elements.

DESCRIPTION OF DRAWINGS

FIG. 2 is a block diagram illustrating a remote control device according to an embodiment of the present invention.

FIG. 5 is a diagram for explaining a configuration of a transparent display device according to an embodiment of the present disclosure.

FIGS. 7 and 8 are diagrams illustrating a process of detecting a direction in which a remote control device is located using RSSI according to an embodiment of the present disclosure.

BEST MODE

Hereinafter, embodiments relating to the present disclosure will be described in detail with reference to the drawings. The suffixes "module" and "unit" for components used in the description below are assigned or mixed in consideration of easiness in writing the specification and do not have distinctive meanings or roles by themselves.

A display device according to an embodiment of the present disclosure is, for example, an intelligent display device that adds a computer supporting function to a broadcast receiving function, and may have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS may be used.

Accordingly, since various applications are freely added or deleted on a general purpose OS kernel, a display device described herein, for example, may perform various user-friendly functions. The display device, in more detail, may be a network TV, Hybrid Broadcast Broadband TV (HBBTV), smart TV, light-emitting diode (LED) TV, organic light-emitting diode (OLED) TV, and so on and in some cases, may be applied to a smartphone.

Figure 1:
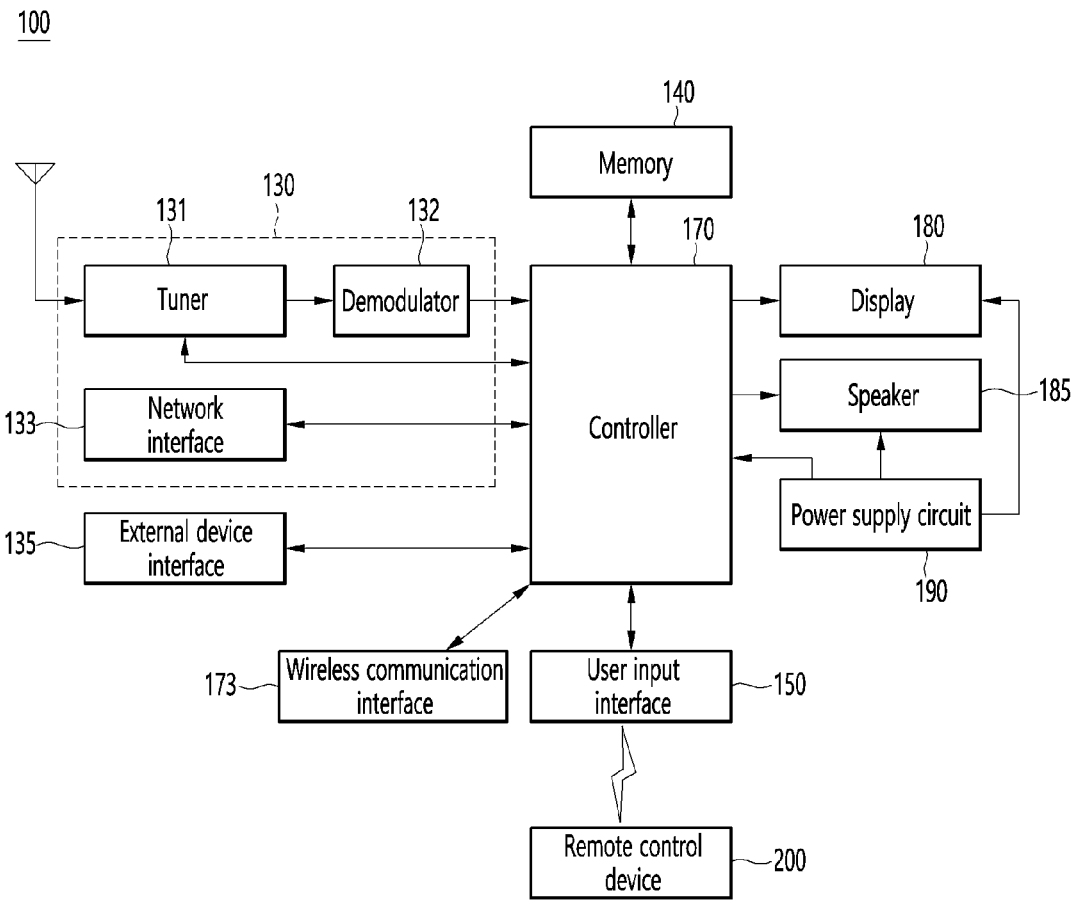
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast receiver 130, an external device interface 135, a storage 140, a user interface 150, a controller 170, a wireless communication interface 173, a display 180, an audio output interface 185, and a power supply 190.

The broadcast receiver 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulator 132 may divide the received broadcast signals into video signals, audio signals, and broadcast program-related data signals, and may restore the divided video signals, audio signals, and data signals into the form capable of being output.

The external device interface 135 may receive an application or an application list in an adjacent external device, and may transmit the application or the application list to the controller 170 or the storage 140.

The external device interface 135 may provide a connection path between the display device 100 and the external device. The external device interface 135 may receive at least one an image or audio output from the external device that is wirelessly or wiredly connected to the display device 100, and may transmit the image and/or the audio to the controller 170. The external device interface 135 may include a plurality of external input terminals. The plurality of external input terminals may include an RGB terminal, at least one High Definition Multimedia Interface (HDMI) terminal, and a component terminal.

An image signal of the external device input through the external device interface 135 may be output through the display 180. A voice signal of the external device input through the external device interface 135 may be output through the audio output interface 185.

An external device connectable to the external device interface 135 may be one of a set-top box, a Blu-ray player, a DVD player, a game console, a sound bar, a smartphone, a PC, a USB memory, and a home theater system, but this is just exemplary.

The network interface 133 may provide an interface for connecting the display device 100 to a wired/wireless network including an Internet network. The network interface 133 may transmit or receive data to or from another user or another electronic device through an accessed network or another network linked to the accessed network.

In addition, some content data stored in the display device 100 may be transmitted to a user or an electronic device, which is selected from other users or other electronic devices preregistered in the display device 100.

The network interface 133 may access a predetermined webpage through an accessed network or another network linked to the accessed network. That is, the network interface 133 may transmit or receive data to or from a corresponding server by accessing a predetermined webpage through the network.

The network interface 133 may receive content or data provided from a content provider or a network operator. That is, the network interface 133 may receive content, such as movies, advertisements, games, VODs, and broadcast signals, which are provided from the content provider or the network operator, and information relating thereto through the network.

In addition, the network interface 133 may receive firmware update information and update files provided from the network operator, and may transmit data to the Internet or content provider or the network operator.

The network interface 133 may select and receive a desired application among applications open to the air, through the network.

The storage 140 may store signal-processed image, voice, or data signals stored by a program in order for each signal processing and control in the controller 170.

In addition, the storage 140 may perform a function for temporarily storing image, voice, or data signals output from the external device interface 135 or the network interface 133, and may store information on a predetermined image through a channel memory function.

The storage 140 may store an application or an application list input from the external device interface 135 or the network interface 133.

The display device 100 may play content files (e.g., video files, still image files, music files, document files, application files, etc.) stored in the storage 140, and may provide the content files to a user.

The user input interface 150 may transmit signals input by a user to the controller 170, or may transmit signals from the controller 170 to a user. For example, the user input interface 150 may receive or process control signals such as power on/off, channel selection, and screen setting from a remote control device 200 or transmit control signals from the controller 170 to the remote control device 200 according to various communication methods such as Bluetooth, Ultra Wideband (WB), ZigBee, Radio Frequency (RF), and IR communication methods.

In addition, the user input interface 150 may transmit, to the controller 170, control signals input from local keys (not shown) such as a power key, a channel key, a volume key, and a setting key.

Image signals that are image-processed by the controller 170 may be input to the display 180 and displayed as images corresponding to the image signals. In addition, image signals that are image-processed by the controller 170 may be input to an external output device through the external device interface 135.

Voice signals processed by the controller 170 may be output to the audio output interface 185. In addition, voice signals processed by the controller 170 may be input to the external output device through the external device interface 135.

Additionally, the controller 170 may control overall operations of the display device 100.

In addition, the controller 170 may control the display device 100 by a user command or an internal program input through the user input interface 150, and may access the network to download a desired application or application list into the display device 100.

The controller 170 may output channel information selected by a user together with the processed image or voice signals through the display 180 or the audio output interface 185.

In addition, the controller 170 may output image signals or voice signals of an external device such as a camera or a camcorder, which are input through the external device interface 135, through the display 180 or the audio output interface 185, according to an external device image playback command received through the user input interface 150.

Moreover, the controller 170 may control the display 180 to display images, and may control the display 180 to display broadcast images input through the tuner 131, external input images input through the external device interface 135, images input through the network interface, or images stored in the storage 140. In this case, an image displayed on the display 180 may be a still image or video and also may be a 2D image or a 3D image.

Additionally, the controller 170 may play content stored in the display device 100, received broadcast content, and external input content input from the outside, and the content may be in various formats such as broadcast images, external input images, audio files, still images, accessed web screens, and document files.

Moreover, the wireless communication module 173 may perform wired or wireless communication with an external device. The wireless communication module 173 may perform short-range communication with an external device. For this, the wireless communication interface 173 may support short-range communication by using at least one of Bluetooth™, Radio Frequency Identification (RFID), Infrared Data Association (IrDA), Ultra Wideband (UWB), Zig-Bee, Near Field Communication (NFC), Wireless-Fidelity (Wi-Fi), Wi-Fi Direct, and Wireless Universal Serial Bus (USB) technologies. The wireless communication module 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication module 173 may detect (or recognize) a wearable device capable of communication around the display device 100. Furthermore, if the detected wearable device is a device authenticated to communicate with the display device 100, the controller 170 may transmit at least part of data processed in the display device 100 to the wearable device through the wireless communication interface 173. Therefore, a user of the wearable device may use the data processed by the display device 100 through the wearable device.

The display 180 may convert image signals, data signals, or on-screen display (OSD) signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown may be integrated, added, or omitted according to the specification of the actually implemented display device 100.

That is, if necessary, two or more components may be integrated into one component or one component may be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface 133 or the external device interface 135 and play them without including the tuner 131 and the demodulator 132.

For example, the display device 100 may be divided into an image processing device such as a set-top box for receiving broadcast signals or contents according to various network services and a content playback device for playing contents input from the image processing device.

In this case, an operating method of a display device according to an embodiment of the present disclosure described below may be performed by one of the display device described with reference to FIG. 1, an image processing device such as the separated set-top box, and a content playback device including the display 180 and the audio output interface 185.

A remote control device according to an embodiment of the present disclosure will be described with reference to FIGS. 2 and 3.

Figure 3:
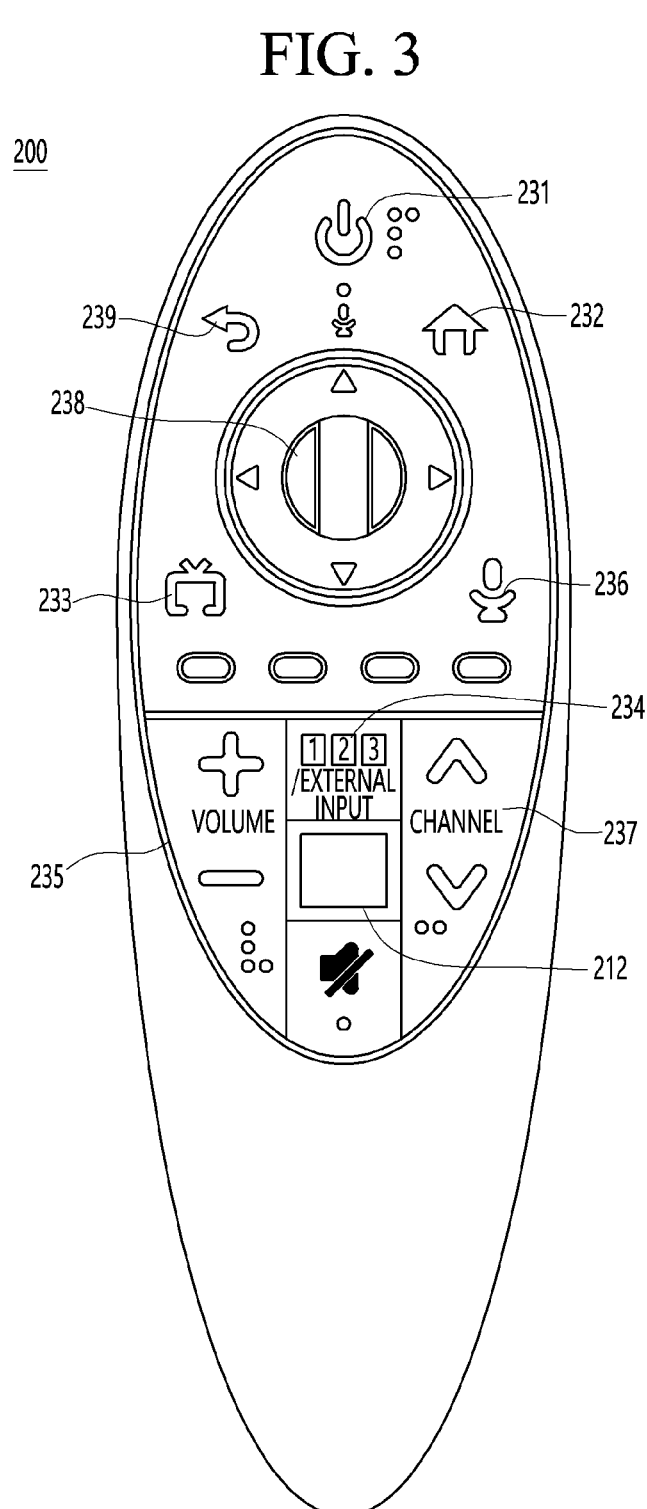
FIG. 3 is a view illustrating an actual configuration of a remote control device according to an embodiment of the present invention.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint recognizer 210, a wireless communication module 220, a user input interface 230, a sensor module 240, an output interface 250, a power supply 260, a storage 270, a controller 280, and a voice acquirer 290.

Referring to FIG. 2, the wireless communication interface 220 transmits/receives signals to/from an arbitrary any one of display devices according to the above-mentioned embodiments of the present disclosure.

The remote control device 200 may include a radio frequency (RF) module 221 capable of transmitting or receiving signals to or from the display device 100 according to an RF communication standard, and an IR module 223 capable of transmitting or receiving signals to or from the display device 100 according to an IR communication standard. In addition, the remote control device 200 may include a Bluetooth module 225 capable of transmitting or receiving signals to or from the display device 100 according to a Bluetooth communication standard. In addition, the remote control device 200 may include an NFC module 227 capable of transmitting or receiving signals to or from the display device 100 according to an NFC communication standard, and a wireless LAN (WLAN) module 229 capable of transmitting or receiving signals to or from the display device 100 according to a WLAN communication standard.

In addition, the remote control device 200 may transmit signals containing information on the movement of the remote control device 200 to the display device 100 through the wireless communication module 220.

Moreover, the remote control device 200 may receive signals transmitted from the display device 100 through the RF module 221 and if necessary, may transmit a command for power on/off, channel change, and volume change to the display device 100 through the IR module 223.

The user input interface 230 may be configured with a keypad, a button, a touch pad, or a touch screen. A user may operate the user input interface 230 to input a command relating to the display device 100 to the remote control device 200. If the user input interface 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be a button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The volume control button 235 may be a button for controlling a volume output from the display device 100. The voice recognition button 236 may be a button for receiving user's voice and recognizing the received voice. The channel change button 237 may be a button for receiving broadcast signals of a specific broadcast channel. The OK button 238 may be a button for selecting a specific function, and the back button 239 may be a button for returning to a previous screen.

FIG. 2 is described again.

If the user input interface 230 includes a touch screen, a user may touch a soft key of the touch screen to input a command relating to the display device 100 to the remote control device 200. In addition, the user input interface 230 may include various kinds of input interfaces operable by a user, for example, a scroll key and a jog key, and this embodiment does not limit the scope of the present disclosure.

The sensor module 240 may include a gyro sensor 241 or an acceleration sensor 243. The gyro sensor 241 may sense information on the movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor that senses a distance with respect to the display 180 of the display device 100.

The output interface 250 may output image or voice signals in response to the operation of the user input interface 235, or may output image or voice signals corresponding to signals transmitted from the display device 100. A user may recognize whether the user input interface 235 is operated or the display device 100 is controlled through the output interface 250.

For example, the output interface 250 may include an LED module 251 for flashing, a vibration module 253 for generating vibration, a sound output module 255 for outputting sound, or a display module 257 for outputting an image, if the user input interface 235 is manipulated or signals are transmitted/received to/from the display device 100 through the wireless communication interface 225.

Additionally, the power supply 260 supplies power to the remote control device 200 and if the remote control device 200 does not move for a predetermined time, stops the power supply, so that power waste may be reduced. The power supply 260 may resume the supply of power if a predetermined key provided at the remote control device 200 is operated.

The storage 270 may store various kinds of programs and application data required to control or operate the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 may store, in the storage 270, information on a frequency band for transmitting/receiving signals to/from the display device 100 paired with the remote control device 200 and refer to it.

The controller 280 controls general matters relating to the control of the remote control device 200. The controller 280 may transmit a signal corresponding to a predetermined key operation of the user input interface 235 or a signal corresponding to the movement of the remote control device 200 sensed by the sensor module 240 to the display device 100 through the wireless communication module 225.

In addition, the voice acquirer 290 of the remote control device 200 may acquire voice.

The voice acquirer 290 may include at least one microphone and acquire voice through the microphone.

Figure 4:
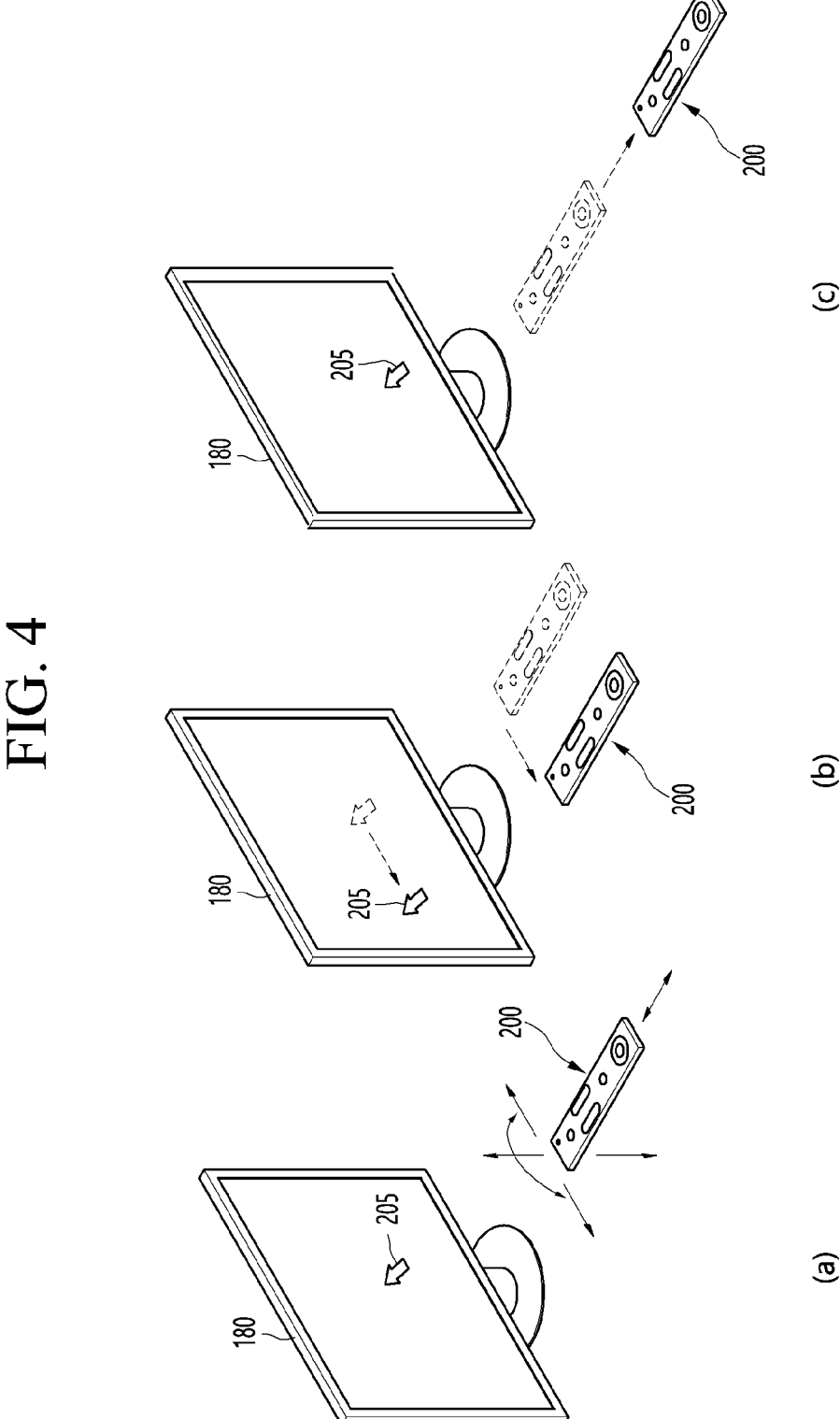
FIG. 4 is a view of utilizing a remote control device according to an embodiment of the present invention.

Next, FIG. 4 is described.

FIG. 4 is a view illustrating an example of utilizing a remote control device according to an embodiment of the present disclosure.

FIG. 4(*a*) illustrates that a pointer 205 corresponding to the remote control device 200 is displayed on the display 180.

A user may move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(*b*) illustrates that if a user moves the remote control device 200, the pointer 205 displayed on the display 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(*c*) illustrates that while a specific button in the remote control device 200 is pressed, a user moves the remote control device 200 away from the display 180. Thus, a selected region in the display 180 corresponding to the pointer 205 may be zoomed in and displayed in an enlarged size.

On the other hand, if a user moves the remote control device 200 close to the display 180, a selection area in the display 180 corresponding to the pointer 205 may be zoomed out and displayed in a reduced size.

On the other hand, if the remote control device 200 is moved away from the display 180, a selection area may be zoomed out and if the remote control device 200 is moved closer to the display 180, a selection area may be zoomed in.

Additionally, if a specific button in the remote control device 200 is pressed, recognition of a vertical or horizontal movement may be excluded. That is, if the remote control device 200 is moved away from or closer to the display 180, the up, down, left, or right movement may not be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display 180 in response to an operation of the remote control device 200. Therefore, in addition to the arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display 180 and also may be displayed in correspondence to a plurality of points such as a line and a surface.

Figure 5:
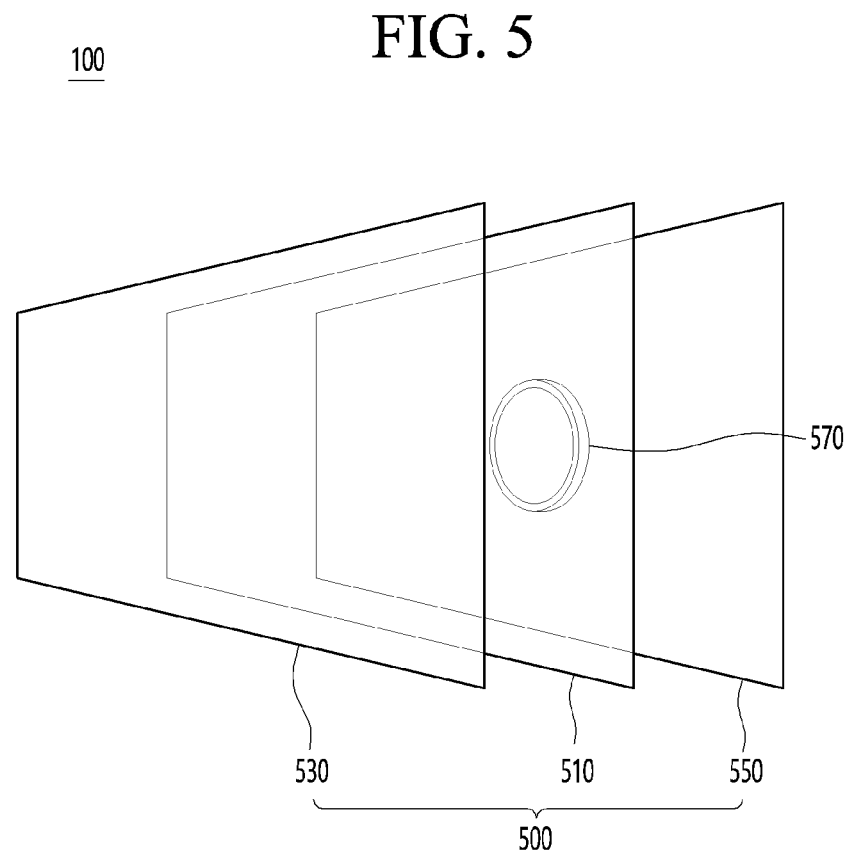

FIG. 5 is a diagram for explaining a configuration of a transparent display device according to an embodiment of the present disclosure.

Referring to FIG. 5, a transparent display device 100 may include a transparent display 500 and a main body 570.

The main body 570 may include the broadcast receiver 130, the external device interface 135, the memory 140, the user input interface 150, the controller 170, the wireless communication interface 173, the speaker 185 and the power supply circuit 190 described in FIG. 1.

The transparent display 500 may perform all functions performed by the display 180 described in FIG. 1.

The transparent display 500 may include a transparent display panel 510, a tempered glass cover 530 and a transparent back cover 550.

The transparent display panel 510 may be a projection display type or a transmissive display type.

The projection type display type may be a type using a technology of projecting light onto a transparent screen to display an image.

The transmissive display type may be a type that uses a technology for changing the transmission of a material itself, such as an OLED that emits light.

The transparent display panel 510 may include an OLED panel in which each pixel includes an organic light emitting diode (OLED). That is, the transparent display panel 510 may have a transmissive display type.

The transparent display panel 510 may include a front panel and a rear panel, and display a front image through the front panel and a rear image through the rear panel.

As another example, the transparent display panel 510 may be provided as a single panel and display a front image through the front side and a rear image through the rear side.

The tempered glass cover 530 may be attached to the front surface of the transparent display panel 510 to protect the transparent display panel 510.

The tempered glass cover 530 may be made of transparent glass to protect the transparent display panel 510 from external impact.

The transparent back cover 550 may be a cover attached to the rear surface of the transparent display panel 510.

The main body 570 may be mounted on a certain area of the transparent back cover 550. The shape of the predetermined area may be circular, but this is only an example, and may have a shape such as a square.

The main body 570 may be connected to a bracket for fixing the transparent display 500 to a wall surface.

The controller 170 provided in the body 570 may apply an electric signal to the transparent display panel 510 to control transmittance of the transparent display panel 510.

The main body 570 may be located in a partial area of the entire area of the transparent display 500.

Figure 6:
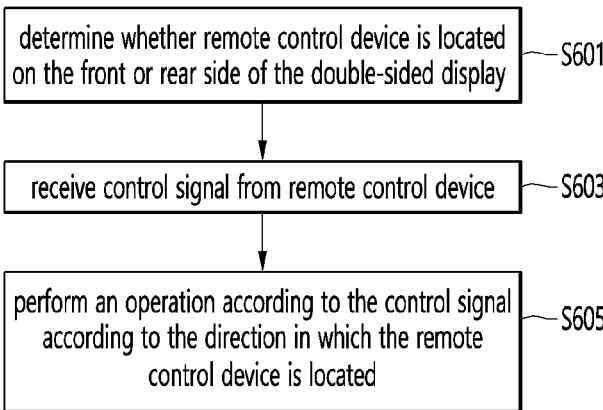
FIG. 6 is a flowchart illustrating a method of operating a display device according to an exemplary embodiment of the present disclosure.

FIG. 6 is a flowchart illustrating a method of operating a display device according to an exemplary embodiment of the present disclosure.

The display device 100 may include a transparent display 500. The transparent display 500 may be a double-sided display outputting images from the front and rear sides.

The transparent display 500 may be referred to as a double-sided display.

The controller 170 of the display device 100 determines whether the remote control device 200 is located on the front or rear side of the double-sided display 500 (S601).

When viewing an image through the double-sided display 500, the user may be located in either the front or rear side of the double-sided display 500. Accordingly, the remote control device 100 manipulated by the user may also be located in one of the front or rear direction of the double-sided display 500.

That is, the user and the remote control device 200 may be in the same position (front or rear).

In one embodiment, the controller 170 may detect the direction in which the remote control device 200 is located based on a received signal strength indicator (RSSI). The controller 170 may determine the direction in which the remote control device 200 is located based on the first RSSI between the access point (AP) and the remote control device 200 and the second RSSI between the AP and the display device 100.

Figure 8:
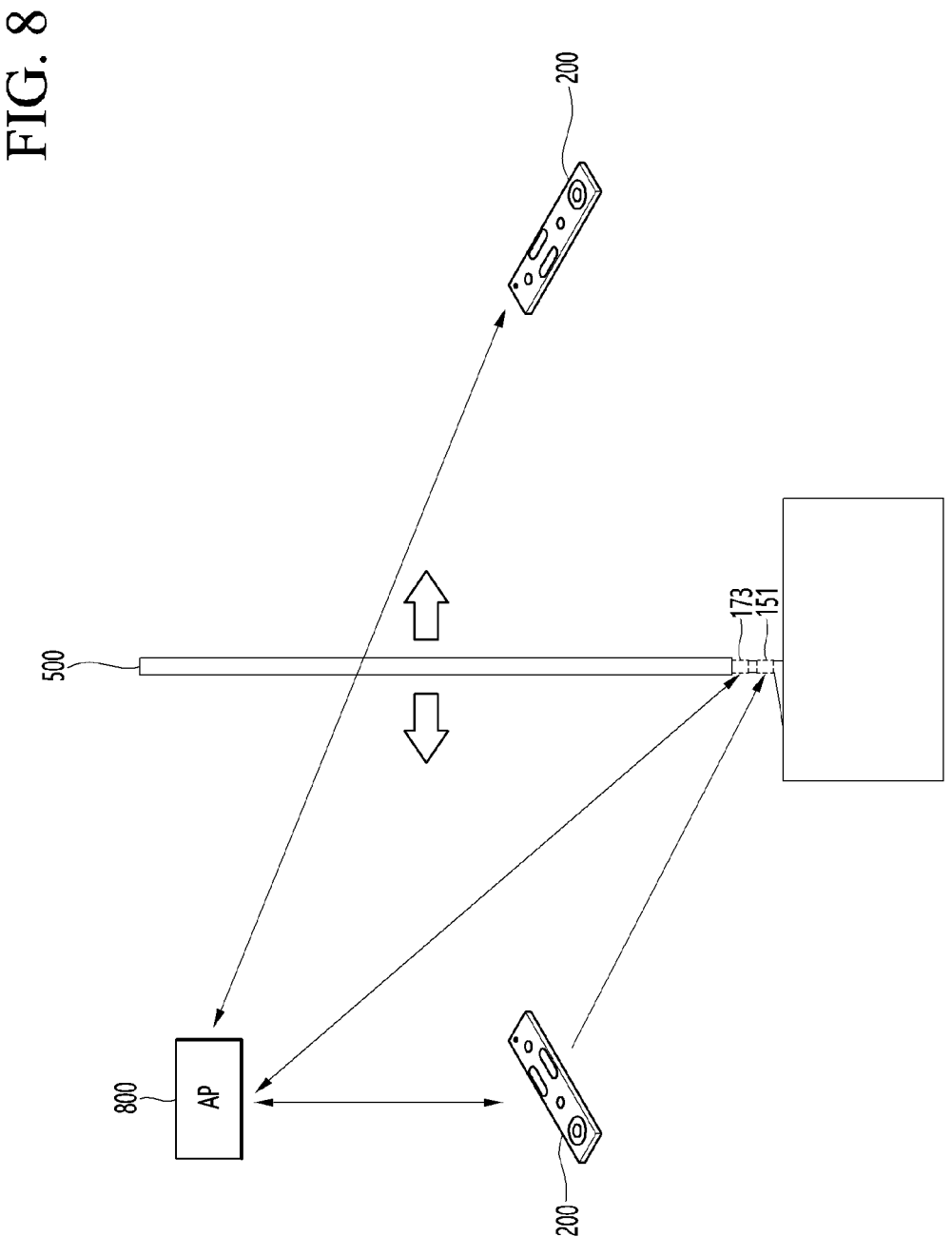

FIGS. 7 and 8 are diagrams illustrating a process of detecting a direction in which a remote control device is located using RSSI according to an embodiment of the present disclosure.

FIGS. 7 and 8 may be an embodiment of step S601 of FIG. 6.

FIGS. 7 and 8, it is assumed that the access point 800 is positioned in front of the double-sided display 500. The access point 800 may be an access point providing an Internet connection. The location of the access point 800 and the location of the double-sided display 500 may be fixed upon initial installation.

The access point 800 may perform wireless communication with the remote control device 200 or the display device 100 through the Wi-Fi standard.

Referring to FIG. 7, the controller 170 of the display device 100 may obtain a first RSSI between the AP 800 and the remote control device 200 and a second RSSI between the AP 800 and the display device 100 (S701).

In an embodiment, the controller 170 may receive the first RSSI and the second RSSI from the AP 800. The AP 800 may measure the first RSSI and the second RSSI and transmit the measured first RSSI and the second RSSI to the wireless communication interface 173 of the display device 100.

The wireless communication interface 173 may include a Wi-Fi circuit, but circuits according to other wireless communication standards may be used.

In another embodiment, the controller 170 may receive the first RSSI from the remote control device 200 and directly measure the second RSSI itself.

The controller 170 determines whether the difference between the first RSSI and the second RSSI is a positive (+) value (S703).

When the positions of the AP 800 and the display device 100 are fixed, the second RSSI may be a reference value for determining the direction in which the remote control device 200 is located. That is, the second RSSI may be a fixed value.

When the difference between the first RSSI and the second RSSI is a positive (+) value, the controller 170 may determine that the remote control device 200 is located in front of the double-sided display 500 (S705).

In FIG. 8, when the remote control device 200 is located in front of the double-sided display 500, since the distance between the remote control device 200 and the AP 800 is smaller than the distance between the display device 100 and the AP 800, the first RSSI may be greater than the second RSSI.

When the first RSSI is greater than the second RSSI, it may be determined that the remote control device 200 is located in front of the double-sided display 500.

Meanwhile, when the difference between the first RSSI and the second RSSI is a negative (−) value according to the relative position between the AP 800 and the display device 100, the remote control device 200 may be determined to be located in front of the double-sided display 500.

If the difference between the first RSSI and the second RSSI is not a positive (+) value, the controller 170 may determine that the remote control device 200 is located on the rear side of the double-sided display 500 (S707).

In this state, the controller 170 may detect that the difference between the first RSSI and the second RSSI changes from a positive value to a negative value.

In this case, the controller 170 may determine that the remote control device 200 has moved from the front side of the double-sided display 500 to the rear side.

If the controller 170 detects that the difference between the first RSSI and the second RSSI changes from a positive value to a negative value, and the negative value is maintained for a certain period of time, the controller 170 may determine that the remote control device 200 is moved from the front to the rear of the double-sided display 500.

As such, according to an embodiment of the present disclosure, the direction in which the remote control device 200 is located may be detected without a user's complicated manipulation.

Meanwhile, when the power is turned on, the display device 100 may acquire the direction in which the remote control device 200 is located.

The controller 170 of the display device 100 may receive an IR signal for power-on from the remote control device 200 through the IR circuit 151 (or IR module) of the user interface 150.

The IR signal may include a first RSSI between the AP 800 and the remote control device 200.

That is, the remote control device 200 may include the pre-obtained first RSSI in the reserved field of the IR signal for power-on.

Before transmitting the IR signal for power-on, the remote control device 200 may directly measure the first RSSI or receive the first RSSI from the AP 800 and insert the first RSSI into the IR signal.

The display apparatus 100 may obtain the first RSSI included in the IR signal by parsing the IR signal for power-on.

The display device 100 may determine whether the remote control device 100 is located on the front or rear side of the double-sided display 500 by using a difference between the first RSSI and the pre-measured second RSSI.

As the display device 100 receives an IR signal for power-on from the remote control device 200, the display device 100 may turn on the power and simultaneously recognize the direction in which the remote control device 200 is located.

As described above, according to an embodiment of the present disclosure, the direction where the remote control device 200 is located can be easily obtained only by a user's operation of selecting a button for turning on the power through the remote control device 200.

Again, FIG. 6 will be described.

In another embodiment, the controller 170 may obtain the direction in which the remote control device 200 is located based on sensing information measured by a motion sensor included in the display device 100.

Figure 9:
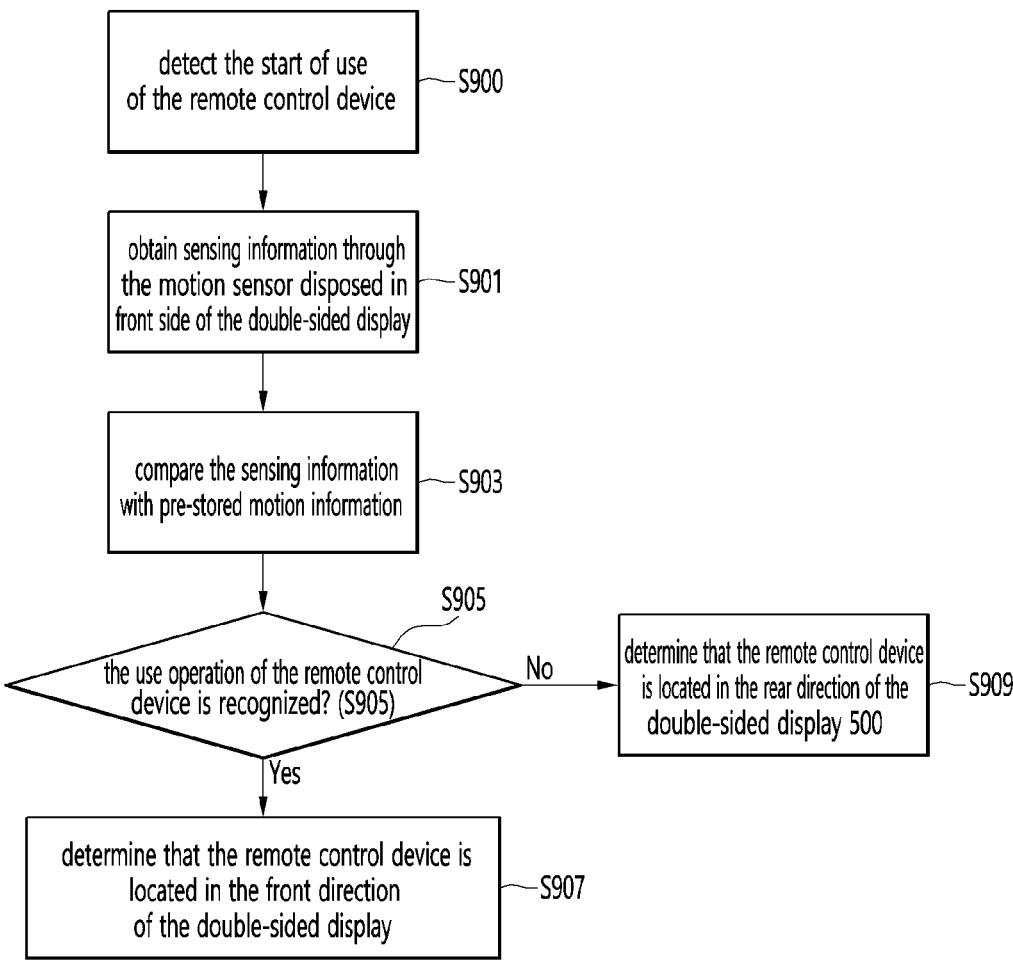
FIGS. 9 and 10 are diagrams illustrating a process of detecting a direction in which a remote control device is located through a motion sensor according to an embodiment of the present disclosure.
Figure 10:
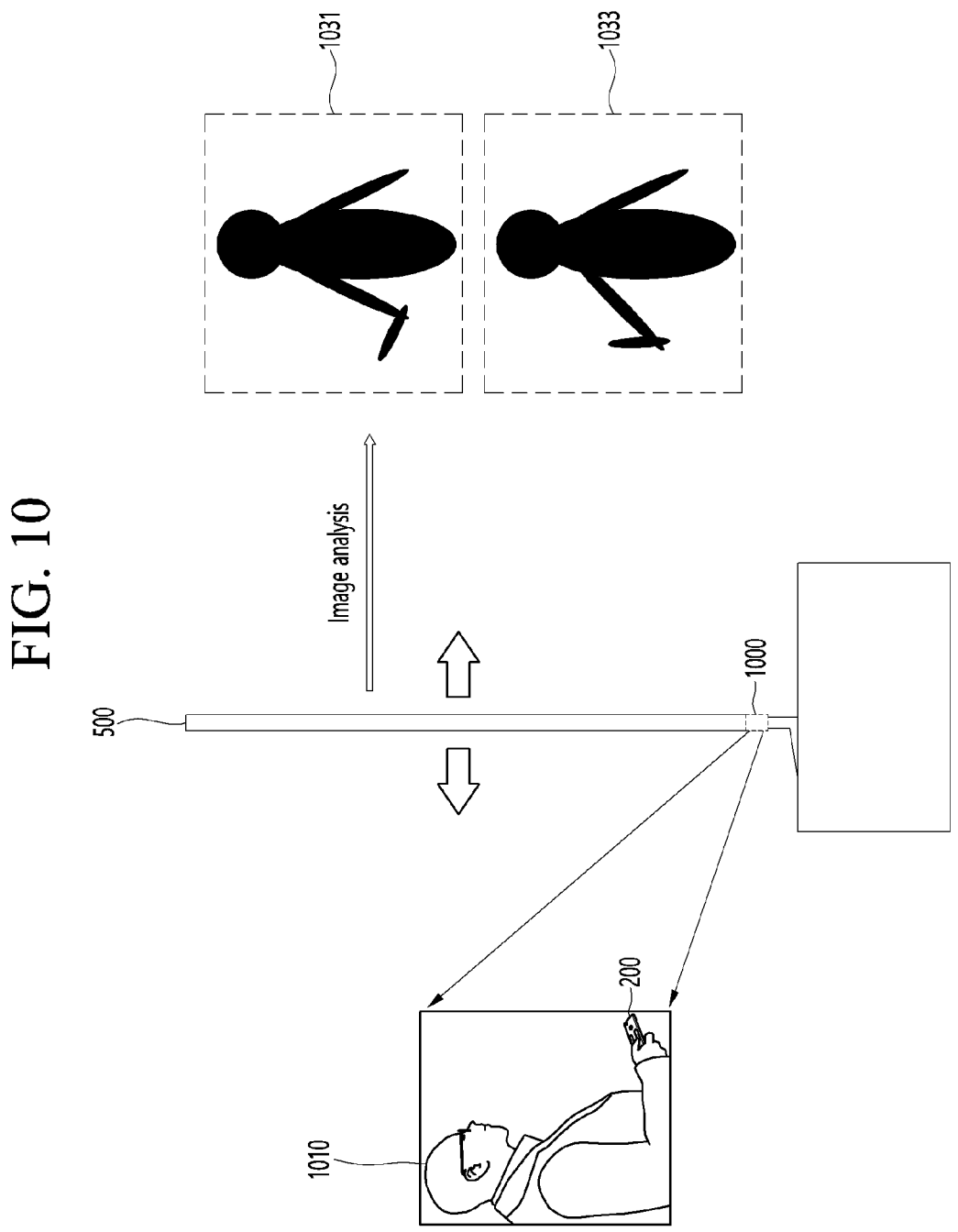

FIGS. 9 and 10 are diagrams illustrating a process of detecting a direction in which a remote control device is located through a motion sensor according to an embodiment of the present disclosure.

Referring to FIG. 9, the controller 170 of the display device 100 may detect the start of use of the remote control device 200 (S900).

In one embodiment, when the controller 170 receives from the remote control device 200 that the sensing value of the gyro sensor 241 provided in the remote control device 200 is changed, the controller 170 may detect that the use of the remote control device 200 start.

The controller 170 may obtain sensing information through the motion sensor 1000 disposed in front of the double-sided display 500 (S901).

The motion sensor 1000 may be disposed on the front side of the double-sided display 500. The motion sensor 1000 may be disposed on the upper or lower front surface of the double-sided display 500.

The motion sensor 1000 may detect infrared ray emitted by a user located in front of the double-sided display 500 and generate sensing information representing the user's motion based on the detected infrared ray.

The sensing information may include a user image representing a user's motion.

The controller 170 may compare the sensing information with pre-stored motion information (S903).

The controller 170 may include sensing information and motion information indicating a plurality of motions stored in the memory 140. The motion information may include motion images corresponding to a plurality of motions in which the user manipulates the remote control device 200.

The controller 170 may determine whether the use operation of the remote control device 200 is recognized according to the comparison result (S905).

The controller 170 may compare the user image and the motion images, and if a motion image having a similarity with the user image of a predetermined value or more exists, determine that the operation of using the remote control device 200 is recognized.

Referring to FIG. 10, the controller 170 may obtain a user image of a user 1010 manipulating the remote control device 200 through the motion sensor 1000.

The controller 170 may compare the obtained user image with the motion images 1031 and 1033 pre-stored in the memory 140.

The controller 170 may determine the user image as an image for manipulating the remote control device 200 when a similarity between one of the motion images 1031 and 1033 and the user image is equal to or greater than a predetermined value.

When it is determined that the use operation of the remote control device 200 is recognized, the controller 170 may determine that the remote control device 200 is located in the front direction of the double-sided display 500 (S907).

The controller 170 may recognize that the remote control device 200 is located in the front side direction of the double-sided display 500 if the use operation of the remote control device 200 and the value of the gyro sensor received from the remote control device 200 is changed.

After determining that the remote control device 200 is located in front, the controller 170 may periodically check the use of the remote control device 200 until the gyro sensor value received from the remote control device 200 does not change.

When it is determined that the use operation of the remote control device 200 is not recognized, the controller 170 may determine that the remote control device 200 is located in the rear direction of the double-sided display 500 (S909).

The controller 170 may determine that the remote control device 200 is located in the rear direction of the double-sided display 500 if the use operation of the remote control device 200 is not recognized and the value of the gyro sensor received from the remote control device 200 is changed.

Again, FIG. 6 will be described.

The controller 170 receives a control signal from the remote control device 200 (S603) and performs an operation according to the control signal according to the determined direction in which the remote control device 200 is located (S605).

In one embodiment, the controller 170, if the remote control device 200 is located in front of the double-sided display 500 and receives a control signal indicating the movement of the remote control device 200, may move the pointer 205 (or cursor) in the same direction as the moving direction of the remote control device 200.

The controller 170, if it is determined that remote control device 200 is located on the rear side of the double-sided display 500 and receives a control signal indicating the movement of the remote control device 200, may move the pointer 205 (or cursor) in the opposite direction as the moving direction of the remote control device 200.

When it is determined that the remote control device 200 is located on the rear side of the double-sided display 500, the controller 170 may change the display direction of the graphic elements to a direction opposite to the existing direction.

Hereinafter, examples of controlling the operation of the display device 100 according to the direction in which the remote control device 200 is located will be described.

FIGS. 11A to 11D are diagrams for explaining examples in which a movement direction of a cursor is changed by movement of a remote control device according to a location of the remote control device.

Figure 11A:
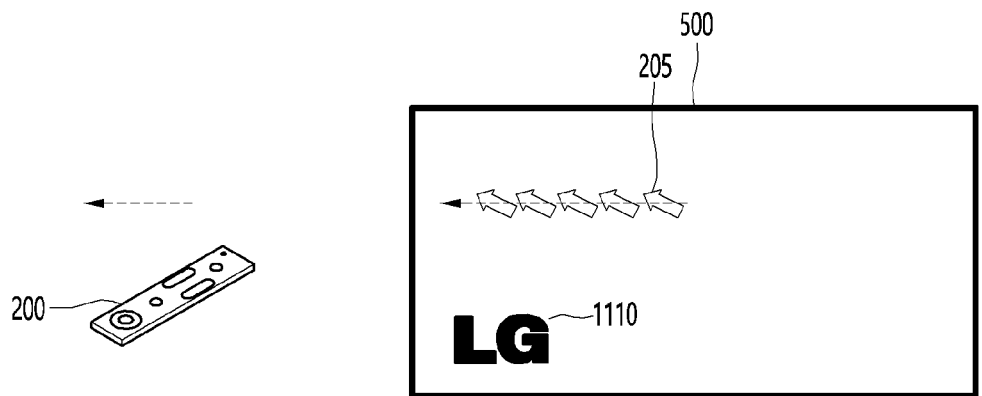
FIGS. 11A to 11D are diagrams for explaining examples in which a movement direction of a cursor is changed by movement of a remote control device according to a location of the remote control device.
Figure 11B:
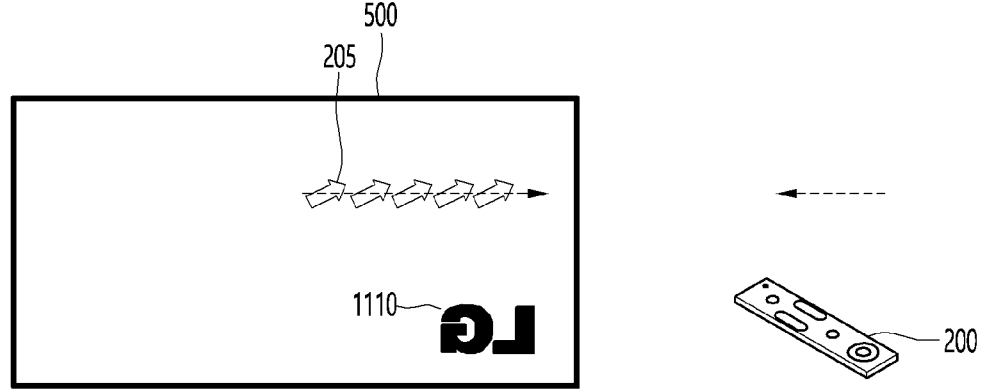
Figure 11C:
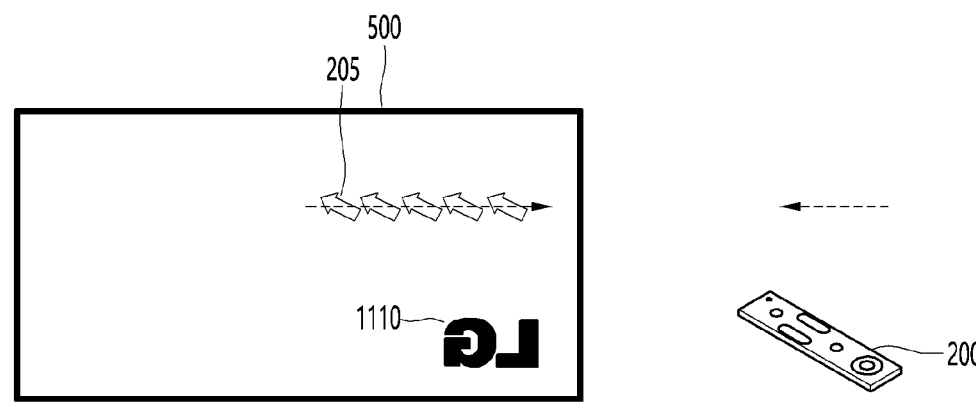
Figure 11D:
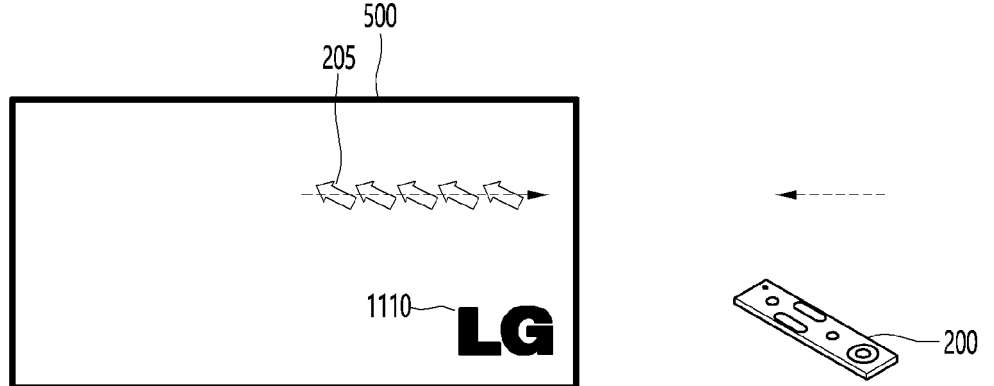

In FIG. 11A, the remote control device 200 is positioned on the front side of the double-sided display 500, and in FIGS. 11B to 11D, the remote control device 200 is positioned on the rear side of the double-sided display 500.

FIGS. 11A to 11D, the display device 100 may receive a movement signal from the remote control device 200 through wireless communication and display a cursor 205 and an image 1110 on the double-sided display 500.

Wireless communication may be Bluetooth communication, but it is only an example.

The image 1110 may be a text image including text.

Referring to FIG. 11A, when the remote control device 200 receives a movement signal in which the remote control device 200 moves from the right direction to the left direction from the remote control device 200, the controller 170 may move the cursor 205 which is moved according to the movement of the remote control device 200 from right to left.

Referring to FIG. 11B, if the controller 170 the remote control device 200 is located on the rear side of the double-sided display 500 and receives a movement signal that the remote control device 200 moves from the right to the left direction, the controller 170 may move the cursor 205 from left to right.

A user located at the rear side may view the text image 1110 in a left-right inverted state.

The controller 170 may change one or more of a display direction of a cursor 205, a shape of the cursor 205, and a color of the cursor 205 if the remote control device 200 is located on the rear side of the double-sided display 500.

When the remote control device 200 is moved from the front to the rear of the double-sided display 500, the controller 170 may change one or more of the display direction of the cursor 205, the shape of the cursor 205, and the color of the cursor 205.

When the remote control device 200 is moved from the front side of the double-sided display 500 to the rear side, the controller 170 may change the display direction of image and graphic elements, and the display position of graphic elements. The graphic elements may include one or more of ab icon, a menu, the cursor 205, and OSD (On Screen Display).

Referring to FIG. 11C, if the remote control device 200 is located on the rear side of the double-sided display 500 and a movement signal in which the remote control device 200 moves from the right to the left direction is received, the controller 170 may invert the cursor 205 to left and right and display the inverted cursor 205 while moving the cursor 205 from the left direction to the right direction.

When the remote control device 200 is located on the rear side of the double-sided display 500, the controller 170 may invert the display direction of the cursor 205 from left to right, unlike FIG. 11B.

The controller 170 may invert the display direction of the cursor 205 to the left-right if the remote control device 200 is located on the rear side of the double-sided display 500, and move the left-right inverted cursor 205 from the left direction to the right direction.

Accordingly, a user located at the rear can see the natural movement of the cursor 205 inverted in left and right.

Referring to FIG. 11D, if the controller 170 receives a movement signal in which the remote control device 200 moves from the right to the left direction and the remote control device 200 is located on the rear side of the double-sided display 500, the controller 170 may invert the text image 1110 in the left-right direction while moving the inverted cursor 205 from the left direction to the right direction.

Accordingly, a user located at the rear can see the natural movement of the cursor 205 and the text image 1110 inverted in left and right direction.

Meanwhile, when the remote control device 200 is located on the rear side and the user is detected only on the rear side of the double-sided display 500, the controller 170 may reverse and display both the main image and graphic elements.

Figure 12A:
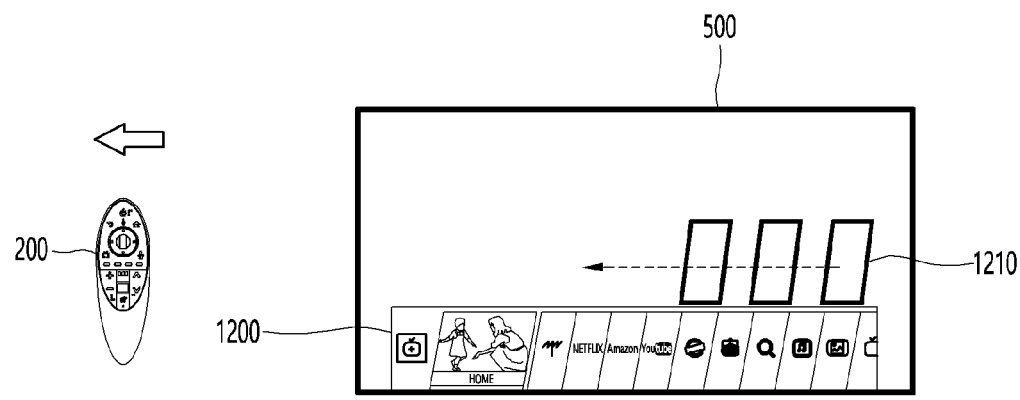
FIGS. 12A and 12B are diagrams for explaining an example in which a moving direction of a selection window is changed by movement of a remote control device according to a location of the remote control device.
Figure 12B:
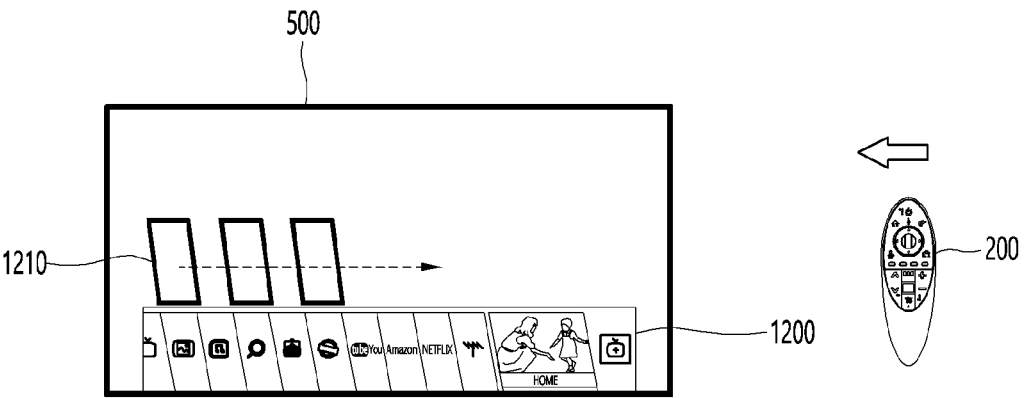

FIGS. 12A and 12B are diagrams for explaining an example in which a moving direction of a selection window is changed by movement of a remote control device according to a location of the remote control device.

In FIGS. 12A and 12B, the double-sided display 500 displays a menu list 1200 including a plurality of menu icons and a selection window 1210 for selecting a menu icon.

In FIG. 12A, the remote control device 200 is positioned on the front side of the double-sided display 500, and in FIG. 12B, the remote control device 200 is positioned on the rear side of the double-sided display 500.

Referring to FIG. 12A, when the controller 170 receives a control signal indicating that the remote control device 200 moves from the right direction to the left direction from the remote control device 200, the controller 170 may move the selection window 1210 from the right direction to the left direction.

Referring to FIG. 12B, when the controller 170 receives a control signal indicating that the remote control device 200 moves from the right direction to the left direction from the remote control device 200, the selection window 1210 is displayed in the left direction. can be moved in the right direction.

That is, when the remote control device 200 is operated from the rear side of the double-sided display 500, the left/right movement operates opposite to the key manipulation of the remote control device 200.

Figure 13A:
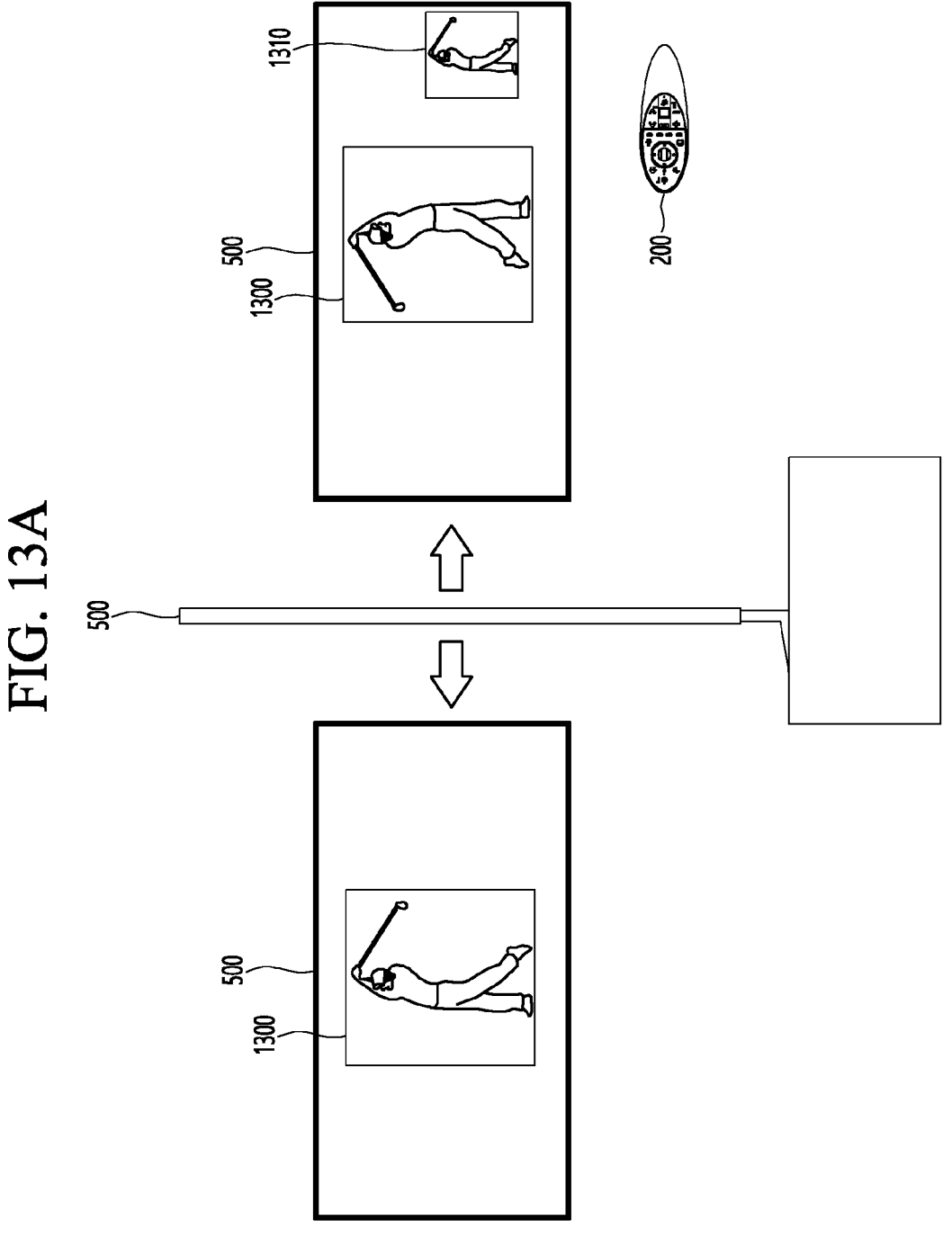
FIGS. 13A and 13B are diagrams illustrating scenarios provided when a remote control device is operated from the rear side of a double-sided display.
Figure 13B:
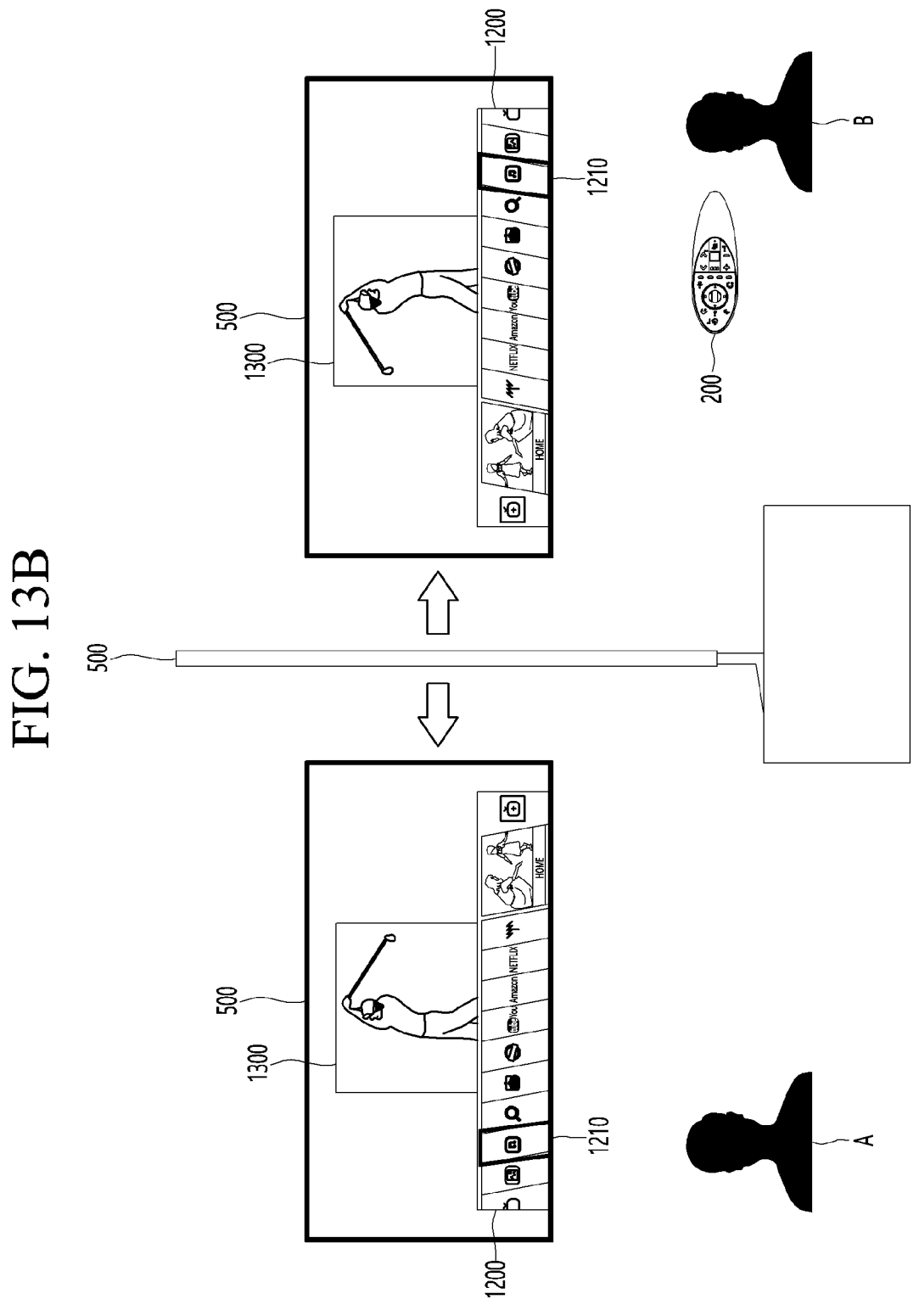

FIGS. 13A and 13B are diagrams illustrating scenarios provided when a remote control device is operated from the rear side of a double-sided display.

Referring to FIG. 13A, the double-sided display 500 displays a content image 1300. On the rear side of the double-sided display 500, the user is watching the left-right inverted content image 1300.

The controller 170 may further display a PIP image 1310 corresponding to the content image 1300 when it is determined that the remote control device 200 is located on the rear side of the double-sided display 500. The PIP image 1310 may be the left-right inverted image of the content image 1300 having a smaller size than the content image 1300.

When the controller 170 determines that users are located on the front and rear sides of the double-sided display 500 and the remote control device 200 is located on the rear side of the double-sided display 500, the controller 170 may further display the PIP image 1310 corresponding to the content image 1300.

That is, when users are located on the front and rear sides of the double-sided display 500, the user located on the front side views the video in the normal direction through the content image 1300, and the user located on the rear side views the video in the normal direction through the PIP image 1310.

The controller 170 may detect a user located in the front or rear through a motion sensor.

According to another embodiment of the present disclosure, when the remote control device 200 is located on the rear side of the double-sided display 500, at least one of contrast or brightness of graphic elements may be adjusted. This may be to compensate for the image quality of the image viewed from the rear, since the image quality of the rear is typically designed to be about 90% of that of the front.

Referring to FIG. 13B, the double-sided display 500 may display a content image 1300, a menu list 1210, and a selection window 1210.

When the remote control device 200 is located on the rear side of the double-sided display 500, the controller 170 may display the original content image 1200 and invert the menu list 1210 and the selection window 1210 to left-right direction.

That is, when the remote control device 200 is located on the rear side of the double-sided display 500, the controller 170 may display only the graphic elements by inverting to left-right direction.

If the controller 170 detects that users A and B are located on the front and rear surfaces of the double-sided display 500, respectively, and the remote control device 200 is located on the rear surface of the double-sided display 500, the controller 170 may display the content image as it is, and invert the menu list 1210 and the selection window 1210 to the left-right direction.

User detection may be performed through a motion sensor.

FIG. 13B may be applied if a child is watching a content image 1300 on the front side of the double-sided display 500, and a parent manipulates a menu list 1200 of the double-sided display 500 through the remote control device 200 on the rear side of the double-sided display 500.

Figure 14:
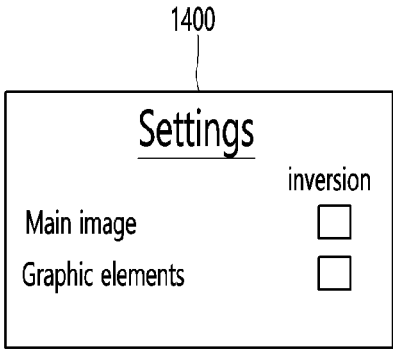
FIG. 14 is a menu screen for setting whether to invert a main image and graphic elements when a remote control device is located on a rear side of a double-sided display according to an embodiment of the present disclosure.

FIG. 14 is a menu screen for setting whether to invert a main image and graphic elements when a remote control device is located on a rear side of a double-sided display according to an embodiment of the present disclosure.

The menu screen 1400 may include menu items for setting whether to invert left-right direction of the main image and graphic elements if the remote control device 200 is located on the rear side of the double-sided display 500.

The user may set to invert only one of the main image or graphic elements through the menu screen 1400.

The user may set not to invert both the main image and the graphic elements through the menu screen 1400.

In another embodiment, the user may set the menu screen 1400 to invert only some of the graphic elements. For example, the user may invert only the cursor 205 through the menu screen 1400 and set other elements not to be inverted.

Figure 15:
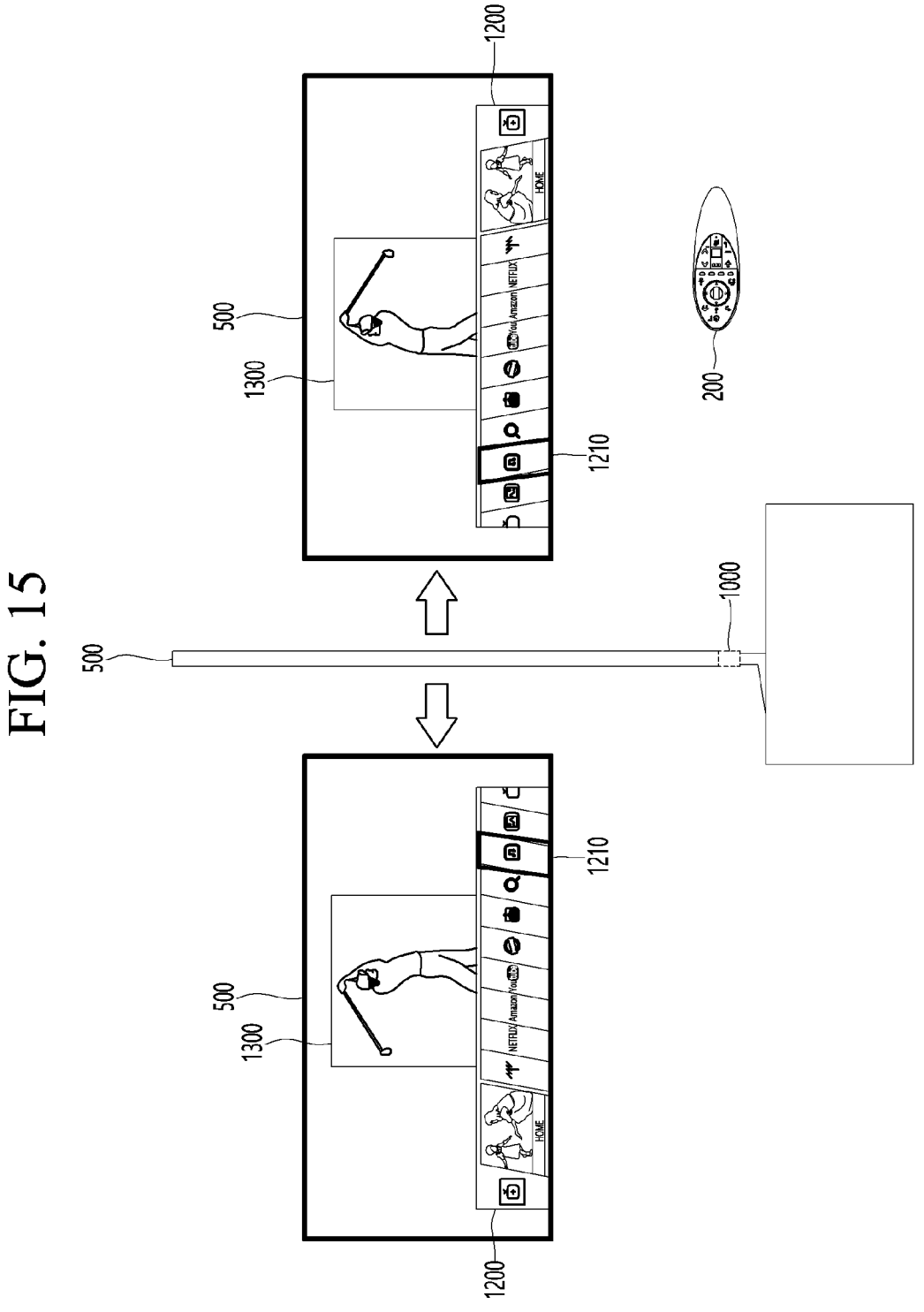
FIG. 15 is a diagram for explaining a scenario in which a location of a remote control device is determined in advance through a motion sensor and a power-on signal is received from the remote control device.

FIG. 15 is a diagram for explaining a scenario in which a location of a remote control device is determined in advance through a motion sensor and a power-on signal is received from the remote control device.

Referring to FIG. 15, the motion sensor 1000 may be always activated according to the always on function even if the power of the display device 100 is not turned on.

The motion sensor 1000 may acquire a user image of the front side of the double-sided display 500 and compare the obtained user image with pre-stored motion images.

As a result of the comparison, the motion sensor 1000 may determine that the remote control device 200 is located on the rear side of the double-sided display 500 if the similarity between any one of the pre-stored motion images and the user image is less than a certain value.

Thereafter, the controller 170 may receive a power-on signal from the remote control device 200 through the IR module, and according to receiving the power-on signal, invert the content image 1300, the menu list 1200, and the selection window 1210 and display the inverted the content image 1300, the menu list 1200, and the selection window 1210.

Accordingly, the user located on the rear side of the double-sided display 500 can watch image and graphic elements in a direction suitable for the user's position only by manipulating the remote control device 200 to power on the display apparatus 100 without any additional manipulation.

Figure 16:
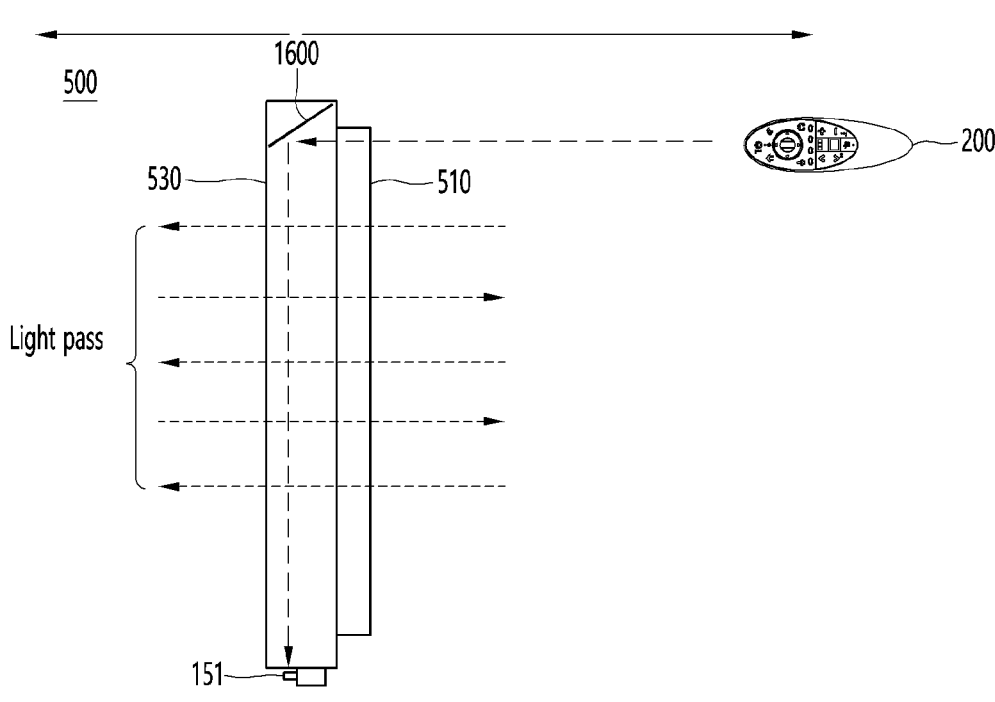
FIG. 16 is a diagram for explaining a structure for controlling an IR signal when a remote control device is located on a rear side of a double-sided display according to an embodiment of the present disclosure.

FIG. 16 is a diagram for explaining a structure for controlling an IR signal when a remote control device is located on a rear side of a double-sided display according to an embodiment of the present disclosure.

Referring to FIG. 16, the double-sided display 500 may include a transparent display panel 510 and a tempered glass cover 530.

The display device 100 may include an IR module 151 under the tempered glass cover 530. The IR module 151 receives IR signals only from the front side of the double-sided display 500.

If the remote control device 200 is located on the rear side and the remote control device 200 transmits an IR signal, the IR module 151 cannot receive the IR signal.

According to an embodiment of the present disclosure, the upper side of the tempered glass cover 530 may include an IR reflection inducing unit 1600.

The IR reflection inducing unit 1600 may reflect the IR signal received from the remote control device 200 downward. Accordingly, the IR signal may pass through the inside of the tempered glass cover 530 and be transmitted to the IR module 151.

The IR reflection inducing unit 1600 may be made of a material capable of reflecting an IR signal, such as metal such as aluminum, mirror, or glass.

As such, the display device 100 according to an embodiment of the present disclosure can normally receive an IR signal even if the remote control device 200 is located on the rear side of the double-sided display 500.

Meanwhile, according to an embodiment of the present disclosure, the memory 140 may store a first key value set corresponding to the case where the remote control device 200 is located in front side of the double-sided display 500 and a second key value set corresponding to the case where the remote control device 200 is located on the rear side of the double-sided display 500.

If the remote control device 200 is located in front of the double-sided display 500, the first key value set may include key values corresponding to functions of the display device 100 corresponding to a control signal received from the remote control device 200.

If the remote control device 200 is located on the rear side of the double-sided display 500, the second key value set may include key values corresponding to functions of the display device 100 corresponding to control signal received from the remote control device 200.

If the controller 170 receives a control signal for moving the cursor 205 or the selection window 1210 from the remote control device 200, based on the stored first key value set or second key value set, may control the cursor 205 or the movement direction of the selection window 1210.

According to an embodiment of the present disclosure, the above-described method can be implemented as a processor-readable code in a medium on which a program is recorded. Examples of media readable by the processor include ROM, RAM, CD-ROM, magnetic tape, floppy disk, optical data storage, and the like.

The display device described above is not limited to the configuration and method of the above-described embodiments, but the above embodiments may be configured by selectively combining all or part of each embodiment so that various modifications can be made.

What is claimed is:

1. A display device, comprising:

a double-sided display including a transparent display panel and having a front side and a rear side;

a receiver configured to receive a control signal from a remote control device; and a controller configured to:

determine that the remote control device is located toward the front side of the double-sided display and display on the double-sided display a first cursor controlled according to movement of the remote control device and having a first shape based on the remote control device being located toward the front side;

determine that the remote control device has been moved from the front side to be located toward the rear side of the double-sided display, cease display of the first cursor, and display on the double-sided display a second cursor controlled according to movement of the remote control device and having a second shape different from the first shape based on the remote control device being moved toward the rear side; and perform an operation according to the received control signal based on the remote control device being located toward the front side or the rear side of the double-sided display, wherein the controller is further configured to:

detect a first user located toward the front side and a second user located toward the rear side of the double-sided display via a sensor;

detect that the remote control device is located toward the rear side of the double-sided display;

display a content image such that it is viewable in a normal display direction from the front side and viewable in a laterally inverted direction from the rear side of the double-sided display; and display a picture-in-picture image of the content image in the normal alignment toward the rear side based on a determination that users are located toward both the front and rear sides of the double-sided display and the remote control device is located toward the rear side of the double-sided display, such that the first user located toward the front side is able to view the content image in the normal display direction on the front side and the second user located toward the rear side is able to view the content image in the normal display direction via the picture-in-picture image concurrently with the content image in the laterally inverted direction.

2. The display device of claim 1, wherein the controller is further configured to:

invert a lateral display direction of the second cursor based on the determination that the remote control device is located toward the rear side of the double-sided display, and move the second cursor with the inverted lateral display direction according to the movement of the remote control device.

3. The display device of claim 1, wherein the controller is further configured to:

display a content image and a graphic element on the double-sided display, wherein the graphic element is laterally inverted based on the determination that the remote control device is located toward the rear side of the double-sided display.

4. The display device of claim 1, further comprising a sensor, wherein the controller is further configured to:

detect a first user located toward the front side and a second user located toward the rear side of the double-sided display via the sensor; and display a content image and a graphic element on the double-sided display wherein the graphic element is laterally inverted based on locations of the detected first and second users and the determination that the remote control device is located toward the rear side of the double-sided display.

5. The display device of claim 1, further comprising a sensor, wherein the controller is further configured to:

detect a first user located toward the rear side of the double-sided display via the sensor; and display a content image and a graphic element on the double-sided display wherein the content image and the graphic element are laterally inverted based on detecting the first user located toward the rear side and the determination that the remote control device is located toward the rear side of the double-sided display.

6. The display device of claim 1, wherein the controller is further configured to:

obtain a first received signal strength indicator (RSSI) between an access point and the remote control device and a second RSSI between the access point and the display device, and determine a front or rear location direction of the remote control device based on a difference between the first RSSI and the second RSSI.

7. The display device of claim 6, wherein the controller is further configured to:

determine that the remote control device is located toward the front side if the difference between the first RSSI and the second RSSI is a positive value, and determine that the remote control device is located toward the rear side if the difference between the first RSSI and the second RSSI is a negative value.

8. The display device of claim 6, wherein the controller is further configured to receive, from the remote control device, an IR signal for power-on of the display device which includes the first RSSI.

9. The display device of claim 1, further comprising:

an infrared motion sensor disposed at the front side of the double-sided display and configured to obtain sensing information representing a user image, wherein the controller is further configured to:

compare the sensing information with motion information including a plurality of pre-stored motion images, and determine a front or rear location direction of the remote control device based on a comparison result.

10. The display device of claim 9, wherein the controller is configured to determine that the remote control device is located toward the front side based on one of the plurality of pre-stored motion images having a similarity with the user image included in the sensing information that is greater than or equal to a predetermined value.

11. The display device of claim 1, wherein the controller is further configured to display a menu for setting whether to laterally invert a displayed content image and a graphic element based on the determination that the remote control device is located toward the rear side.

12. The display device of claim 1, further comprising an infrared motion sensor configured to detect that the remote control device is located toward the rear side, wherein the controller is configured to laterally invert a displayed content image and a graphic element based on receiving a power-on signal from the remote control device.

13. The display device of claim 1, wherein:

the double-sided display includes a tempered glass cover, the receiver includes an IR module, and a top of the tempered glass cover includes a reflector configured to reflect, to the IR module, an IR signal transmitted by the remote control device which is located toward the rear side of the double-sided display.

14. A method of operating a display device comprising a double-sided display including a transparent display panel and having a front side and a rear side, the method comprising:

determining that a remote control device is located toward the front side of the double-sided display and displaying on the double-sided display a first cursor controlled according to movement of the remote control device and having a first shape based on the remote control device being located toward the front side;

determining that the remote control device has been moved from the front side to be located toward the rear side of the double-sided display, ceasing display of the first cursor, and displaying on the double-sided display a second cursor controlled according to movement of the remote control device and having a second shape different from the first shape based on the remote control device being moved toward the rear side;

receiving a control signal from the remote control device; and performing an operation according to the received control signal based on the remote control device being located toward the front side or the rear side of the double-sided display, wherein performing the operation comprises:

detecting a first user located toward the front side and a second user located toward the rear side of the double-sided display via a sensor;

detecting that the remote control device is located toward the rear side of the double-sided display;

displaying a content image in a normal alignment on the front side and the content image in a left-right inverted alignment on the rear side of the double-sided display; and displaying a picture-in-picture image of the content image in the normal alignment toward the rear side along with the displayed content image in the left-right inverted alignment based on a determination that users are located toward both the front and rear sides of the double-sided display and the remote control device is located toward the rear side of the double-sided display, wherein the first user located toward the front side is able to view the content image in the normal alignment on the front side and the second user located toward the rear side is able to view the content image in the normal alignment via the picture-in-picture image.

15. The method of claim 14, further comprising:

inverting a lateral display direction of the second cursor based on the determination that the remote control device is located toward the rear side of the double-sided display, and moving the second cursor with the inverted lateral display direction according to the movement of the remote control device.

16. The method of claim 14, further comprising:

displaying a content image and a graphic element on the double-sided display, wherein the graphic element is laterally inverted based on the determination that the remote control device is located toward the rear side of the double-sided display.

17. A display device, comprising:

a double-sided display including a transparent display panel;

a receiver configured to receive a control signal from a remote control device; and a controller configured to:

obtain a first received signal strength indicator (RSSI) between an access point and the remote control device and a second RSSI between the access point and the display device, determine a location direction of the remote control device related to whether the remote control device is located toward a front side or a rear side of the double-sided display based on a difference between the first RSSI and the second RSSI; and perform an operation according to the received control signal based on the determined location direction of the remote control device.

* * * * *